United States Patent [19]

Jibiki

[11] Patent Number: 5,419,882
[45] Date of Patent: May 30, 1995

[54] METHOD FOR THE REMOVAL OF THALLIUM

[75] Inventor: Kyo Jibiki, Pointe-Claire, Canada

[73] Assignee: Noranda Inc., Toronto, Canada

[21] Appl. No.: 231,099

[22] Filed: Apr. 22, 1994

[51] Int. Cl.⁶ ............................................. C25C 1/16
[52] U.S. Cl. ..................................... 423/111; 75/416; 204/114
[58] Field of Search .................. 75/365, 416, 419, 422; 204/114, 115, 116, 117, 118, 119; 423/111, 115

[56] References Cited

U.S. PATENT DOCUMENTS

| | | | |
|---|---|---|---|
| 4,071,421 | 1/1978 | Masters | 204/96 |
| 4,096,233 | 6/1978 | Bodson | 423/101 |
| 4,274,931 | 6/1981 | Verbaan | 204/119 |
| 4,292,283 | 9/1981 | Weigel | 423/107 |
| 4,439,288 | 3/1984 | Hoffman | 204/114 |
| 5,120,353 | 6/1992 | Fugleberg et al. | 75/419 |

FOREIGN PATENT DOCUMENTS 634853  3/1993  Australia ..................... C22B 61/00

*Primary Examiner*—John Niebling
*Assistant Examiner*—Brendan Mee
*Attorney, Agent, or Firm*—Keck, Mahin & Cate

[57] ABSTRACT

A method for removing thallium ions from aqueous solutions uses manganese dioxide sludge produced during the electrolysis of zinc. The preferred allotropy of $MnO_2$ is the α-form, which selectively absorbs thallium ions with minimum interference from other elements and metal ions present in the solution, and is significantly more economical than other reagents currently used for the same purpose.

7 Claims, No Drawings

METHOD FOR THE REMOVAL OF THALLIUM

FIELD OF THE INVENTION

The present invention is concerned with a method for the removal of thallium ions, more specifically thallous ions, in aqueous solutions.

BACKGROUND OF THE INVENTION

In the production of zinc metal employing the roast-leach-electro-winning method, thallium ions in ZnSO4 solution deposit preferentially over zinc ions during the electrolysis, thus contaminating the zinc metal recovered at the cathodes. Therefore, it is mandatory to keep the concentration of thallium ions in the electrolyte at levels as low as possible. In general, the low concentrations of thallium are achieved in the solution purification step, in which zinc metal powder is used to cement out dissolved elements nobler than zinc. Though this is the commonly used method in the zinc industry, very narrow operational conditions are required to achieve efficient thallium removal.

Residues produced in the zinc dust purification step contain valuable metals like copper, cadmium, cobalt and nickel, and are generally further processed to recover these metals. During the recovery process, the thallium present therein redissolves and remains in the leach solution, which are often recycled to the leach plant. Thus, thallium remains in the closed loop leach circuit, which necessitates a bleed for the thallium from the circuit.

In the zinc industry, the removal of thallium ion is effected by addition of potassium permanganate, potassium dichromate or potassium chromate in the streams where cadmium metal is recovered. The addition of potassium permanganate converts thallous (Tl$^{+1}$) ions to thallic (Tl$^{+3}$) ions, the latter being insoluble at pH values above 3, thus precipitating as Tl(OH)$_3$. This process cannot be used economically for solutions containing high concentrations of ionic species which are oxidized with the permanganate ion. Manganese ion is a good example. The presence of manganese ion in solution consumes permanganate ions before thallous ions are oxidized, resulting in high consumption rate of potassium permanganate, which is an extremely expensive reagent.

On the other hand, the addition of potassium dichromate or potassium chromate to solutions containing thallium results in the formation of thallous dichromate and thallous chromate, which are relatively insoluble at ambient temperature, and precipitate. Since the thallous dichromate/chromate solubility increases with temperature, the solution must be kept at lower temperatures to enhance the efficiency of the process. Also the process introduces chromium, an undesirable element, in the zinc solution circuit, necessitating an additional step for removing chromium if no outlet for this element exists in the circuit. Again, the economical aspect of this process is questionable, since potassium dichromate and potassium chromate are expensive reagents. Further, they introduce a new metal, chromium, which compel one to remove this metal from the solution.

Ozone and persulphate compounds are also known to convert thallous (Tl$^{+1}$) ions to thallic (Tl$^{+3}$) ions and to precipitate the thallic hydroxide (Tl(OH)$_3$). However, like the preceding reagents, these are also very strong oxidizers, and oxidize other elements that may be present in the aqueous solution, for example chloride, nickel, cobalt and manganese. This process, like the others discussed above, is limited to solutions containing low concentrations of elements susceptible of being oxidized by the reagents.

Recently, ion exchange resins were found to remove thallium ion in aqueous streams (see AU 634,853). However, this technology has not been exploited on a commercial scale.

There is therefore a great need to develop a method for effectively removing thallium ions present in aqueous solutions without affecting the other elements or metal ions present in the solution with minimum reagent consumption. Further, such method would use an inexpensive reagent, and both the method and the reagent should be environmentally friendly.

SUMMARY OF THE INVENTION

In accordance with the present invention, there is now provided a method for removing thallium ions from aqueous solutions with the use of the manganese dioxide sludge, which selectively absorbs thallium ions without oxidizing other metals present in the solution, and is significantly cheaper than other reagents currently used for the same purpose.

The sludge can be of any manganese dioxide allotropy, but that produced during the electrolysis of zinc, typically the $\alpha$-form, is preferred. Cryptomelane has been identified as the preferred $\alpha$-form.

DETAILED DESCRIPTION OF THE INVENTION

The method of the present invention is particularly useful for removing thallium ions from ZnSO$_4$ or CdSO$_4$ aqueous solutions, and also allows an improved disposal method of materials containing thallium. Further, the present method can be operated at any temperature from room temperature up to the boiling point of the solution, and in a wide range of pH, the appropriate pH being a function of the chemical composition of the solution. Preferably, the pH is lower than 4 when thallium is removed from zinc-containing solutions.

The present method is not affected by the presence of manganese ions (Mn$^{2+}$) in the solution, and requires less time for reaction completion than conventional methods. The chemical reaction in which thallium ions are taken up with cryptomelane is suspected to be

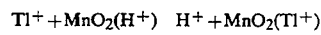

$$Tl^+ + MnO_2(H^+) \rightleftharpoons H^+ + MnO_2(Tl^+)$$

A preferred embodiment of the method of the present invention utilizes well ground manganese dioxide sludge obtained from zinc electrowinning cells. Such sludge is generally produced by the oxidation reactions of manganese ions present in the electrolyte at the anodes. The sludge is then recovered from the anode surface by removing the surface layer and also from the bottom of the cells where the sludge settles. The grinding of the sludge is not mandatory, but certainly recommended. Thallium removal is effective at any neutral leach pH's, pH values lower than 4 are preferred, particularly in zinc calcine leaching solutions, for the efficient use of the manganese dioxide sludge. As stated above, the temperature has little impact on the process. Thallium ions originating from calcine and recycled streams are removed from the leach solution with a sufficient amount of manganese dioxide sludge. This amount of sludge added depends on the concentration of thallium in the solution, but generally does not exceed 20 g/L. A complete removal of thallium in neutral leach is not necessary, because the regular zinc dust purification processes can remove thallium effectively as long as it is maintained at a low concentration. A minimum retention time of 20 minutes is adequate to substantially remove all the thallium. The neutral leach residue containing the thallium loaded $MnO_2$ sludge can be separated from the solution by any conventional solids/liquid separation techniques.

Another application example of this invention is the removal of thallium ions in the section of the cadmium processing in the zinc industry. High thallium ion concentrations are often found in the streams where cadmium metal is recovered from the zinc dust purification residues. The solution containing thallous ions at higher concentrations can be treated with manganese dioxide sludge. The amount of sludge added is function of the thallium concentration in the solution. Generally, from 0.5 to 20 g/L are preferred. Complete removal of thallium ions from this solution is not always required, but it is preferred that the concentration be reduced to the lowest possible level. This can be achieved with the method of the present invention. The slurry of the solution containing thallium and/or the thallium-loaded manganese dioxide sludge may either be filtered to effect solid-liquid separation or be mixed in other streams in the zinc recovery circuit, filtration being the preferred mode of removing the sludge. In case where the slurry is filtered, the recovered cake containing $Tl^+$ may be processed further to recover thallium metal or its compounds.

The thallium-loaded manganese dioxide can be easily decomposed in a weakly acidic solution in the presence of a reducing agent such as gaseous sulphur dioxide, sulphite chemicals, ferrous ion-containing compounds, sulphide minerals and concentrates and hydrogen peroxide, which are all known to reduce manganese dioxide allotropies. By minimizing the leach solution volume, a high concentration of the dissolved thallium ion can be maintained. Conventional zinc dust cementation and electrolysis can be used to yield metallic thallium from the solution. For the production of purer thallium metal, the thallium-containing solution is treated to remove unwanted impurities other than thallium prior to the zinc dust cementation and the electrolysis.

Applications of the current invention is not limited to the streams of zinc hydrometallurgical processes. The invention can be applied to any aqueous solution containing thallous ($Tl^{+1}$) ion. For example, effluents from lead smelters often contain thallous ions and its removal is not effected by conventional lime neutralization. Further, the method may also be performed in any type of reactor, for example, a tank containing a mixer, a tube reactor, a fluidized bed reactor, and the like.

The present invention will now be illustrated by the following examples, which are provided to illustrate the invention rather than limit its scope.

EXAMPLE 1

An industrial zinc sulphate solution produced in the neutral leach step at a zinc refinery and containing 150 g/L of $Zn^{+2}$, 423 mg/L of $Cd^{+2}$, 903 mg/L of $Cu^{+2}$, 17 mg/L of $Co^{+2}$, 7 g/L of $Mn^{+2}$ and 7 g/L of $Mg^{+2}$ as major ionic species, is doped with thallium sulphate at thallium ion concentrations of about 13 and about 130 mg/L. 1 L of this solution is heated to 80° C. Various reagents, which have potential of removing thallium ion, are added to the solution, while it is gently agitated. The pH of the solution is maintained at 4 with the addition of zinc oxide or sulphuric acid. Aliquot samples are taken at appropriate intervals to examine the decline in thallium ion concentration in the solution.

Tables 1 and 2 below summarize the results of thallium ion concentrations in the aliquot samples. As it can be seen, for the thallium removal from the solution of a low thallium concentration, the higher concentration of potassium permanganate (2 g/L) removed approximately 50% of the thallium. On the other hand, manganese dioxide sludge concentration of 5 g/L removed almost completely all the thallium in the solution. Manganese ore containing pyrolusite, which has a chemical composition similar to that of the manganese dioxide sludge, and potassium dichromate were not effective in removing thallium ion.

TABLE 1

| | Thallium remaining in solution with several reagents (mg/L) | | | | |
|---|---|---|---|---|---|
| | Reagent | | | | |
| Time (min.) | Mn Ore 5 g/L | $K_2Cr_2O_7$ 2 g/L | $KMnO_4$ 1 g/L | $KMnO_4$ 2 g/L | $MnO_2$ Sludge 5 g/L |
| 0 | 13.8 | 13.8 | 13.8 | 13.8 | 13.8 |
| 15 | 13.8 | 12.7 | 9.4 | 6.0 | 0.6 |
| 30 | 13.1 | 13.0 | 10.1 | 7.7 | 0.5 |
| 45 | 13.7 | 13.7 | 10.1 | 6.2 | 0.5 |
| 60 | 14.1 | 14.0 | 9.7 | 7.3 | 0.5 |

When the thallium concentration is increased ten times in the solution (Table 2), only partial thallium removal is achieved by potassium dichromate and potassium permanganate. The manganese dioxide sludge is again very effective in removing thallium in the solution.

TABLE 2

| | Thallium remaining in solution with several reagents (mg/L) | | | | | |
|---|---|---|---|---|---|---|
| | Reagent | | | | | |
| Time (min.) | $KMnO_4$ 1 g/L | $KMnO_4$ 2 g/L | $K_2Cr_2O_7$ 1 g/L | $K_2Cr_2O_7$ 2 g/L | $MnO_2$ Sludge 5 g/L | $MnO_2$ Sludge 10 g/L |
| 0 | 137 | 137 | 137 | 137 | 137 | 137 |
| 10 | 100 | 88 | 55 | 56 | 24 | — |
| 15 | — | — | — | — | — | 0.5 |
| 20 | 106 | 86 | 49 | 55 | 20 | — |
| 30 | 122 | 100 | 44 | 51 | 18 | 0.5 |

EXAMPLE 2

An industrial zinc sulphate solution is doped with thallium sulphate at thallium ion concentrations of about 13 and about 138 mg/L. While the solution is mildly agitated, manganese sludge ground to −400 mesh (Tyler series) is added at concentrations of 1–10 g/L. Tables 3 and 4 list the thallium analyses of the aliquot samples taken during the tests carried out at temperatures of 40° and 80° C.

TABLE 3

Thallium remaining in solution at 40 and 80° C. with different concentrations of MnO$_2$ dioxide sludge added (mg/L)

Temperature and concentration of MnO$_2$ sludge added

| Time (min) | 80° C. 1 g/L | 80° C. 2 g/L | 80° C. 3 g/L | 80° C. 4 g/L | 40° C. 1 g/L | 40° C. 2 g/L | 40° C. 3 g/L | 40° C. 4 g/L |
|---|---|---|---|---|---|---|---|---|
| 0  | 13.5 | 13.5 | 12  | 13.5 | 13.5 | 13.5 | 12  | 13.5 |
| 10 | 9.9  | 6.6  | 3.1 | 3.2  | —    | —    | —   | —    |
| 15 | —    | —    | —   | —    | —    | —    | 2.7 | —    |
| 20 | 9.5  | 6.3  | 2.4 | 2.5  | 8.9  | 5.4  | —   | 2.4  |
| 30 | 8.9  | 5.7  | 2.8 | 2.6  | —    | —    | 2.2 | —    |
| 40 | —    | —    | —   | —    | 8    | 4.5  | —   | 1.3  |
| 60 | —    | —    | —   | —    | 7.7  | 4.2  | 1.8 | 1.3  |

TABLE 4

Thallium remaining in solution at 40 and 80° with different concentrations of MnO$_2$ dioxide sludge added (mg/L)

Temperature and concentration of MnO$_2$ sludge added

| Time (min) | 80° C. 10 g/L | 80° C. 5 g/L | 80° C. 2 g/L | 40° C. 10 g/L | 40° C. 5 g/L | 40° C. 2 g/L |
|---|---|---|---|---|---|---|
| 0  | 138 | 138 | 138  | 138 | 138  | 138  |
| 10 | 0.7 | 9.9 | 62.8 | 0.5 | 22   | 74.9 |
| 30 | 0.5 | 3.9 | 45.6 | 0.5 | 10.8 | 59.6 |
| 60 | 0.5 | 2.3 | 34.1 | 0.5 | 4.7  | 50.2 |

As can be seen in these tables, thallium ion concentrations are significantly reduced by the addition of manganese dioxide sludge. The concentration of manganese dioxide sludge added determines the final concentration of thallium ion, and temperature has less influence on the final thallium concentration.

EXAMPLE 3

The industrial zinc sulphate solution used in the examples 1 and 2 is doped with thallium sulphate at a thallium ion concentration of 11.9 mg/L. The thallium-doped solution (1 L) is warmed to 80° C. The solution is mildly agitated and 3 g of manganese sludge ground to −400 mesh are added. The pH of the slurry is maintained at specified values with zinc oxide or sulphuric acid during the test period. The thallium ion analytical results for the aliquot samples are listed in Table 5. As can be seen in this table, a pH range between 1.5 and 3 favoured the thallium removal.

TABLE 5

Thallium remaining in solution at various pH values (mg/L)

| Time (min) | pH value 4.2 | 3 | 2 | 1.5 | 1 |
|---|---|---|---|---|---|
| 0  | 11.9 | 11.9 | 11.9 | 11.9 | 11.9 |
| 10 | 7.4  | 3.1  | 1.4  | 5.4  | 8.7  |
| 20 | 7.7  | 2.4  | 1.3  | 3.3  | 9.5  |
| 30 | 7.4  | 1.6  | 0.9  | 2.9  | 9.5  |

The same industrial zinc sulphate solution at a concentration of thallium of 11.9 mg/L is heated to 80° C., and 3 g/L of MnO$_2$ sludge in various Tyler mesh size fractions are added. The solution pH is not controlled, but reaches about 3.5 for all the runs. Table 6 summarizes the thallium analysis of the solutions at various residence times.

TABLE 6

Thallium remaining in solution with various mesh size of MnO$_2$ particles (mg/L)

| Time (min) | −100 +200 | −200 +400 | −400 |
|---|---|---|---|
| 0  | 11.9 | 11.9 | 11.9 |
| 10 | 7.6  | 5.4  | 3.1  |
| 20 | 5.6  | 4.1  | 2.4  |
| 30 | 4.5  | 3.3  | 2.8  |

For the −400 mesh fraction, the thallium extraction is completed within 20 minutes. For the larger fractions, the thallium extraction still occurs after 30 minutes. These results indicate that though coarser particles provide good results, even better results are obtained with finer particles.

EXAMPLE 4

The same zinc sulphate solution used in Example 3, which is doped with thallium ions at 11.9 mg/L, is utilized to examine the thallium removal with various manganese dioxide compounds. For these tests, the solution is heated to 80° C., and finely ground (−400 mesh) manganese dioxide compounds are added at concentrations of 3 g/L. Every 10 minutes, aliquot samples are taken for thallium analysis. The results are summarized in Table 7.

TABLE 7

Thallium remaining in solution with different MnO$_2$ compounds (mg/L)

Thallium in solution (mg/L)

| Time (min) | EMD IC#20 | EMD IC#26 | EMD IC#4 | Mn Ore IC#7 | MnO$_2$ Sludge I | MnO$_2$ Sludge II |
|---|---|---|---|---|---|---|
| 0  | 11.9 | 11.9 | 11.9 | 11.9 | 11.9 | 11.9 |
| 10 | 11.3 | 11.3 | 10.1 | 11.6 | 0.5  | 0.7  |
| 20 | 11.6 | 11.4 | 10.0 | 11.5 | 0.5  | 0.5  |
| 30 | 11.8 | 11.5 | 9.9  | 11.5 | 0.5  | 0.5  |

As can be seen in the above table, various international common samples of the electrolytic manganese dioxide (EMD) organized by the International Battery Association, pyrolusite manganese dioxide are incapable of removing Tl ions. Only the MnO$_2$ sludge samples collected at the plant zinc electrowinning cells are capable of effectively removing Tl ions.

EXAMPLE 5

Using the same zinc sulphate solution and a manganese sludge sample, which is ground to a −400 mesh size, the effect of the solution temperature on the thallium removal rate has been investigated. The solution is maintained between 40° and 90° C. while 3 g/L of the manganese dioxide sludge are added to the solution which is mildly agitated. Table 8 lists the analytical results on the aliquot samples for thallium ion. It can be seen that the thallium removal is slightly faster at higher temperatures, and that the final minimum thallium level increases with temperature.

TABLE 8

Thallium remaining in solution at various temperatures with −400 mesh $MnO_2$ particles in a concentration of 3 g/L (mg/L)

| Time (min) | Temperature (°C.) | | | |
|---|---|---|---|---|
| | 40 | 60 | 80 | 90 |
| 0 | 11.9 | 11.9 | 11.9 | 11.9 |
| 10 | — | — | 3.1 | 4.4 |
| 15 | 2.7 | 3.1 | — | — |
| 20 | — | — | 2.4 | 3.5 |
| 30 | 2.2 | 2.5 | 2.8 | 3.1 |
| 60 | 1.8 | 1.5 | — | — |
| 90 | 1.3 | 1.4 | — | — |

EXAMPLE 6

Laboratory tests have been carried out to simulate the conventional neutral leaching process used in the zinc industry. For these tests, 1 L of the low acid leach recycle solution, containing 4 or 9 g/L of $Fe^{3+}$, 6 or 9 mgFL of $Tl^+$, 10 g/L of $H_2SO_4$ and other unspecified impurities, is heated at 80° C. 140 g of industrial zinc calcine, which contains 54.6% Zn, 12.4% Fe, 0.4% Pb, 0.61% Cu and less than 0.5 ppm of Tl as major elements, are added to the solution and the temperature of the slurry is maintained at 80° C. under agitation. The pH of the slurry is maintained at either 3.7 or 4.2 with the addition of industrial spent zinc electrolyte, which contains 55 g/L $Zn^{+2}$, 180 g/L $H_2SO_4$, 4 g/L $Mn^{+2}$, 8 g/L of $Mg^{+2}$ as major ionic species, from the zinc electrowinning cells. Generally, 250-350 mL of spent electrolyte are needed to maintain the slurry pH in the specified range. The batch test is carded out for 60 minutes. Manganese dioxide sludge obtained from zinc electrolysis cells and ground to −400 mesh is added at various points in the test. The sludge addition rates of 1-5 g/L of the low acid leach solution are employed in these tests. Aliquot samples are taken at 20, 40 and 60 minutes to examine the Tl level in the batch solution.

In the selected tests runs, the neutral leach residue is further treated under the low acid leach (weak acid leach) conditions to examine the dissolution of the thallium precipitated in the neutral leach. The neutral leach slurry is settled overnight and the supernatant is subsequently removed. The settled residue slurry (about 400 mL) is then acidified to a pH value of 1.5 with addition of the same spent electrolyte at 70° C. Aliquot samples are taken at 20, 40 and 60 min. Table 9 summarizes the Tl analysis of the aliquot samples taken during these tests where the effects of the neutral leach pH, the concentration and timing of the manganese dioxide sludge and the initial ferric iron level in the low acid leach solution on the thallium removal.

TABLE 9

| | Neutral Leach Conditions | | | | Tl in neutral leach filtrate (mg/L) | | | Tl in low acid leach filtrate (mg/L) | | |
|---|---|---|---|---|---|---|---|---|---|---|
| | | $MnO_2$ sludge Addition | | $Fe^{3+}$ | 20 | 40 | 60 | | | |
| Run | pH | g/L | Time (min) | g/L | min | min | min | 20 min | 30 min | 40 min |
| 1 | 4.2 | 0 | — | 4 | 5.6 | 5.6 | 6.1 | — | — | — |
| 2 | 4.2 | 3 | 20 | 4 | 6.2 | 2.9 | 3.0 | — | — | — |
| 3 | 4.2 | 3 | 0 | 4 | 3.2 | 3.0 | 2.8 | — | — | — |
| 4 | 4.2 | 3 | 20 | 9 | 6.1 | 3.5 | 3.1 | — | — | — |
| 5 | 4.2 | 3 | 40 | 4 | 5.4 | 5.2 | 3.4 | — | — | — |
| 6 | 3.7 | 3 | 20 | 4 | 6.0 | 1.1 | 1.1 | — | — | — |
| 7 | 3.7 | 2 | 20 | 4 | 5.9 | 2.3 | 2.3 | — | — | — |
| 8 | 3.7 | 1 | 20 | 4 | 5.4 | 3.3 | 3.7 | — | — | — |
| 9 | 4.2 | 0 | — | 4 | 9.7 | 9.4 | 9.4 | — | — | — |
| 10 | 4.2 | 5 | 20 | 4 | 9.7 | 3.9 | 3.1 | <0.5 | <0.5 | <0.5 |
| 11 | 4.2 | 5 | 40 | 4 | 9.7 | 9.5 | 4.1 | <0.5 | <0.5 | <0.5 |
| 12 | 3.7 | 5 | 20 | 4 | 10.8 | 1.0 | 0.9 | — | — | — |
| 13 | 3.7 | 3 | 20 | 4 | 10.4 | 3.1 | 2.6 | — | — | — |
| 14 | 3.7 | 1 | 20 | 4 | 10.6 | 6.9 | 6.6 | — | — | — |

As can be seen in the above table, the thallium ion concentrations in the neutral leach solution are at 5-6 and 9-10 mg/L without the addition of the manganese dioxide sludge. These concentration levels are significantly lowered by the manganese dioxide sludge addition, and the lower pH values favour the thallium removal. Further, ferric ion concentration has no effect on the thallium removal. Though the thallium removal is almost completed 20 minutes after the addition of the manganese dioxide sludge, it is further improved after 40 minutes. Therefore, 40 minutes are required to obtain the highest possible removal rate of thallium with the manganese dioxide sludge.

As evidenced by the results in Table 9, when the produced neutral leach residue is subjected to the low acid leach conditions, no redissolution of the thallium from the residue takes place.

EXAMPLE 7

The method of the present invention can also be used to remove thallium ion in effluent of industrial plants. Two examples given below illustrate such application.

Two samples of industrial effluent are obtained from a primary lead smelter. One sample contains thallium ion at 350 mg/L and the other at 12.5 mg/L. Other elements analyzed are cadmium and zinc. 1 L of each sample is mildly agitated and a manganese dioxide sludge ground to a −400 mesh size fraction is added to it at addition rates of 0.5 to 7 g/L. Aliquot samples are taken at 20, 40 and 60 minutes and analyzed for thallium ion. The results are summarized in Table 10.

TABLE 10

| $MnO_2$ Sludge Addition | Sample Time (min) Head | Effluent 1* $Tl^+$ level 350 mg/L | Effluent 2** $Tl^+$ level 12.5 mg/L |
|---|---|---|---|
| 0.5 g/L | 20 | — | 0.65 |
| | 40 | — | 0.22 |
| | 60 | — | 0.22 |
| 1 g/L | 20 | 250 | <0.1 |
| | 40 | 270 | <0.1 |
| | 60 | 280 | <0.1 |
| 3 g/L | 20 | 160 | <0.1 |

TABLE 10-continued

| MnO$_2$ Sludge Addition | Sample Time (min) Head | Effluent 1* Tl$^+$ level 350 mg/L | Effluent 2** Tl$^+$ level 12.5 mg/L |
|---|---|---|---|
|  | 40 | 170 | <0.1 |
|  | 60 | 160 | <0.1 |
| 5 g/L | 20 | 100 | 0.62 |
|  | 40 | 83 | <0.1 |
|  | 60 | 88 | <0.1 |
| 7 g/L | 20 | 50 | — |
|  | 40 | 3.1 | — |
|  | 60 | 3.0 | — |

*Cd 6.3 g/L, Zn 3.37 g/L; pH = 4.8
**Cd 20.8 mg/L, Zn 26.8 mg/L; pH = 3.8

For effluent #1 with the higher thallium level, a 7 g/L sludge addition rate is needed to lower the thallium level to less than 10 mg/L. For effluent #2 of the lower thallium level, a sludge addition rate of 0.5 g/L is enough to lower the thallium level to less than 1 mg/L from 12.5 mg/L. Here again, the effectiveness of the manganese dioxide sludge in removing thallium ion in effluents is demonstrated.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A method for selectively removing thallium ions from an aqueous solution, comprising contacting the aqueous solution with a manganese dioxide sludge in an amount sufficient so that substantially all the thallium ions are absorbed by the sludge, and separating the thallium-containing sludge from the solution by solid-liquid separation.

2. A method according to claim 1 wherein the sludge is obtained from zinc electrowinning cells.

3. A method according to claim 1 wherein the allotropy of manganese dioxide is the α-form.

4. A method according to claim 1 wherein the size of the particles of manganese dioxide sludge is −400 mesh (Tyler series).

5. A method according to claim 1, wherein the manganese dioxide sludge concentration in the solution is from 0.5 to 20 g/L.

6. A method according to claim 1 wherein the temperature of the aqueous solution varies from room temperature up to the boiling point of the solution.

7. A method according to claim 1, wherein the aqueous solution is zinc electrolyte.

* * * * *